(12) United States Patent
Maurer

(10) Patent No.: US 6,402,174 B1
(45) Date of Patent: Jun. 11, 2002

(54) RECUMBENT TRICYCLE WITH CONTROLLED WHEEL AND BODY LEAN

(76) Inventor: Alan Maurer, 14056 Leon La., Tallahassee, FL (US) 32312

(*) Notice: Subject to any disclaimer, the term of this patent is extended or adjusted under 35 U.S.C. 154(b) by 0 days.

(21) Appl. No.: 09/827,498

(22) Filed: Apr. 6, 2001

(51) Int. Cl.[7] .............................. B62K 5/04; B62K 5/08
(52) U.S. Cl. .................... 280/267; 280/282; 280/288.1; 280/269; 280/266
(58) Field of Search ................................ 280/267, 266, 280/220, 226.1, 282, 288.1, 269, 124.103, 93.506; D12/112

(56) References Cited

U.S. PATENT DOCUMENTS

| | | | | |
|---|---|---|---|---|
| 4,360,244 A | * | 11/1982 | Sato et al. ................... | 280/772 |
| 4,373,740 A | * | 2/1983 | Hendrix ....................... | 280/269 |
| 4,432,561 A | * | 2/1984 | Feikema ............... | 280/281 LP |
| 4,456,277 A | * | 6/1984 | Carpenter .................... | 280/282 |
| 4,460,190 A | * | 7/1984 | Spiess ......................... | 280/247 |
| 4,469,344 A | * | 9/1984 | Coil ............................. | 280/269 |
| 4,624,469 A | | 11/1986 | Bourne ........................ | 280/112 |
| 4,634,137 A | | 1/1987 | Cocksedge .................. | 280/256 |
| 4,650,213 A | | 3/1987 | Fujita .......................... | 280/772 |
| D290,451 S | * | 6/1987 | Engum ....................... | D12/112 |
| 4,903,857 A | | 2/1990 | Klopfenstin ................ | 280/267 |
| 4,921,263 A | | 5/1990 | Patin ........................... | 280/62 |
| 4,998,596 A | | 3/1991 | Mikstiz ....................... | 180/213 |
| 5,263,732 A | * | 11/1993 | Harmeyer ................ | 280/288.1 |
| 5,544,906 A | * | 8/1996 | Clapper ................... | 280/288.1 |
| 5,568,935 A | | 10/1996 | Mason ........................ | 280/263 |
| 5,762,351 A | | 6/1998 | Soohoo ....................... | 280/267 |
| 6,062,581 A | | 5/2000 | Stites .......................... | 280/263 |

FOREIGN PATENT DOCUMENTS

| | | | |
|---|---|---|---|
| JP | 3-82689 | * | 4/1991 |
| JP | 3-109191 | * | 5/1991 |

* cited by examiner

Primary Examiner—Avraham Lerner

(57) ABSTRACT

Three-wheeled vehicle with an adjustable leaning and steering mechanism, permitting operator-controlled wheel and body lean as the vehicle is making a turn. The vehicle (100) has a leaning main frame (20) that carries the pedals (21) and crank assembly (22), recumbent seat (30) and rear wheel (40). Towards the front of the vehicle (100), a perpendicular axle housing (42) mounted with pivotal collar (44) allows the main frame (20) to lean right or left. Axle housing (42) carries the cantilevered steering arms (46) and adjustable steering levers (48). An axle (56) runs through the axle housing (42) and a spindle (60) and control arm (58) is pivotally connected to each end of the axle (56). Wheels (70R and 70L) are mounted on each spindle (60). Swivel tie rods (72) connect the control arms (58) of both front wheels (70R and 70L) to the main frame (20) so that when the main frame (20) is leaned, all wheels (70R, 70L and 40) lean laterally, producing simultaneous wheel and body lean. Tie rods (74) also connect each control arm (58) to the adjustable steering levers (48), rotating the control arms (58) and axle (56) as a unit. Operator supplies power to lean frame by use of arms pushing body right or left; the body, being cradled in seat (30), causes frame to lean right or left. By rotating steering levers (48) from vertical to 45 degrees forward, the turning effect achieved is adjustable in relation to the amount of body lean, allowing operator to make wide or tight turns and adjust the amount of lean to compensate for cornering forces to optimize the center of gravity or go straight and adjust body lean to compensate for road pitch.

7 Claims, 9 Drawing Sheets

RECUMBENT TRICYCLE WITH CONTROLLED WHEEL AND BODY LEAN

CROSS REFERENCE TO RELATED APPLICATIONS

Not applicable.

FIELD OF INVENTION

This invention relates to three-wheeled vehicles, specifically, to an improved steering mechanism that leans wheels and body into turn.

BACKGROUND OF THE INVENTION

Many types of arrangements have been proposed for leaning body and wheels into a turn in order to increase a vehicle's stability by counteracting the cornering forces that tend to make vehicles unstable during turns and tip over or throw operator out. Soohoo, U.S. Pat. No. 5,762,351, Klopfenstein, U.S. Pat. No. 4,903,857, and Cocksedge, U.S. Pat. No. 4,634,137, all show pedal-powered lean-steer tricycles with high centers of gravity with operator aboard and upright riding position which is uncomfortable and produces high wind-resistance.

Fujita, U.S. Pat. No. 4,650,213, and Boume, U.S. Pat. No. 4,624,469, show motor-driven lean-steer tricycles, both are heavy and so, unsuited for pedal power.

Patin, U.S. Pat. No. 4,921,263, Miksitz, U.S. Pat. No. 4,998,596, Mason, U.S. Pat. No. 5,568,935 and Stites, U.S. Pat. No. 6,062,581 all show leanable tricycles with a single front wheel and two rear wheels, which is fine for straight line motion but, when executing a turn at high speed and braking, the forward momentum of the operator, combined with centrifugal forces, overpowers the stability of the single front wheel and either tips the vehicle over or ejects the operator. Conversely, in a vehicle with two front wheels spaced apart, the centrifugal forces and forward momentum of the operator are sustained by the forward outside wheel, giving much more support where the forces are directed.

Accordingly, there exists a need for a vehicle that combines the qualities of: being light, so that it is easy to pedal or be powered by a small, energy-efficient motor; recumbently seated for comfort, enhanced pedaling, reduced wind resistance and lower center of gravity; at least two wheels spaced apart near front of vehicle for support during turns and braking; capable of wheel and body lean to reduce side-loading forces on wheels and improve cornering capabilities.

SUMMARY OF THE INVENTION

A recumbent-seated, 3 wheeled, pedal powered vehicle comprising two frames pivotally connected perpendicular to each other with steering mechanism that allows for leaning body and wheels into a turn and independent adjustment of the turning radius, while inducing an effect to the 2 front wheels similar to Ackerman steering compensation, where the inside wheel turns more sharply than the outside wheel, reducing scrubbing of tires during turns.

Steering is accomplished by leaning body right or left and rotating steering levers by use of arms and hands to maneuver through turns. From straight line motion, lean must be initiated through use of arms and hands to enter a cornering mode. Balance during turns is accomplished by adjusting amount of body lean to compensate for centrifugal force and rotating steering levers for sharpness of turn. Seat is positioned to optimize the operator's center of gravity so the amount of effort needed to keep the body in a balanced position is not excessive; thus, providing a vehicle with wheel and body lean, that has excellent handling characteristics and is virtually tip-over proof and rightable from maximum lean at standstill.

OBJECTS AND ADVANTAGES

Several objects and advantages of my invention are: recumbent seat for comfort, enhanced pedaling, reduced wind resistance, and lower center of gravity than standard bicycle seat and upright pedaling. The recumbent position is roughly defined as where the operator is reclining in a feet-forward position. This keeps the operators legs relatively horizontal during pedaling. Since the thighs of the operator do not move down below the level of the seat, the seat can be of full width. Additionally, this position provides an ergonomic seat back—the seat can support the buttocks and spine of the operator for increased comfort and efficiency.

Another object of the invention is to provide a steering mechanism that leans wheels and body into a turn to compensate for centrifugal forces, also providing the advantage of moving the center of gravity closer and lower toward the center of the turn and, at the same time, moving the contact patch of the tires farther out from the center of the turn. This leaning effect is advantageous in human powered vehicles because it conserves energy by avoiding braking during turns.

Another advantage is the reduction or elimination of side loading forces in a turn; this allows for the use of lighter weight wheels and tires, since essentially only radial forces are applied to the wheels during a turn. The lighter wheels and tires further enhance the handling characteristics of the tricycle by reducing the gyroscopic forces that must be overcome to steer.

The steering mechanism also has the advantage of providing a similar effect to "Ackerman Steering Compensation", where the inside wheel turns more sharply than the outside wheel, thus reducing the scrubbing of tires. This design achieves better handling characteristics through a simpler design than other wheel and body lean vehicles, thus improving upon prior art.

Another advantage is that reduced side-loading stress permits use of lighter construction materials. A variety of rigid, lightweight materials could be used to manufacture the tricycle, including, but not limited to, steel, aluminum, titanium, carbon fiber. All of the bicycle components, i.e. pedals, crank, chain, gears, derailers, shifters, brakes and brake levers, (if motor-driven, throttle and clutch as on motorcycles) are readily available or easily made by one knowledgeable in the art; no special manufacturing processes or requirements needed.

With a lightweight frame, shock-absorbing suspension is not necessary, since the majority of mass is the operator. Mounting the seat on springs or providing a seat cushion or attaching a sling seat to the seat frame with shock cords would improve comfort without adding significantly to vehicle weight.

Hands and arms are used on steering levers to control both leaning and steering of tricycle, so it is easily and quickly adjusted for changing road conditions and obstacles.

Another object of the invention is the turning radius is independently adjustable in relation to the amount of wheel and body lean induced by the operator, allowing the operator to make wide or tight turns at variable speeds or g o straight and lean body to compensate for road conditions such as pitch or crown or uneven pavement. This quality produces a tricycle with excellent handling and stability at all speed and road conditions. Other advantages of tricycle of invention:
1. Due to increased stability, track width may be reduced.
2. Greater stability than bicycles when riding in windy conditions.
3. Easy starting and stopping—no need to take feet off pedals to balance when stopped.
4. Superior braking and load bearing capacity to bicycle.
5. Provides a stable platform that may be fully enclosed and streamlined for speed and comfort.
6. Further, a human or engine-powered version would provide a viable commuter or sport vehicle, suitable for races, recreation or exercise.

One disadvantage is that, if leaned to either maximum point while at a standstill, greater effort is needed to return the body to vertical apex; however, at all but the lowest speeds, the gyroscopic effect of the wheels helps balance the body upright. Additionally, positioning of seat height and inclination affects the operator's center of gravity and so can reduce the amount of effort needed to return the body to a vertical balanced position.

The above and other objects and features of the invention will become apparent from the following description, with reference to the accompanying drawings.

LIST OF REFERENCE NUMERALS

Figure 1:
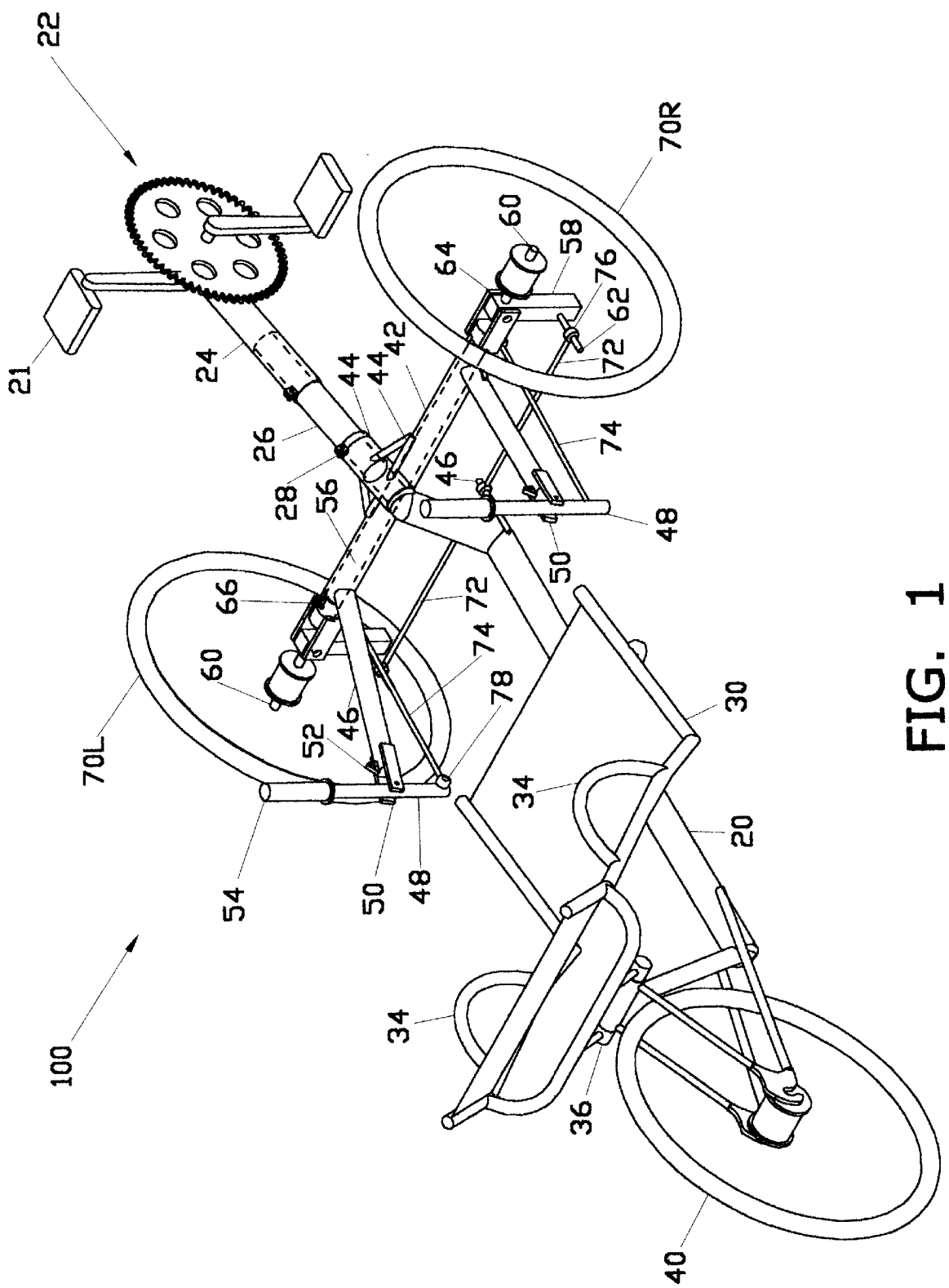
FIG. 1 is a perspective view of preferred embodiment of vehicle 100.
Figure 2:
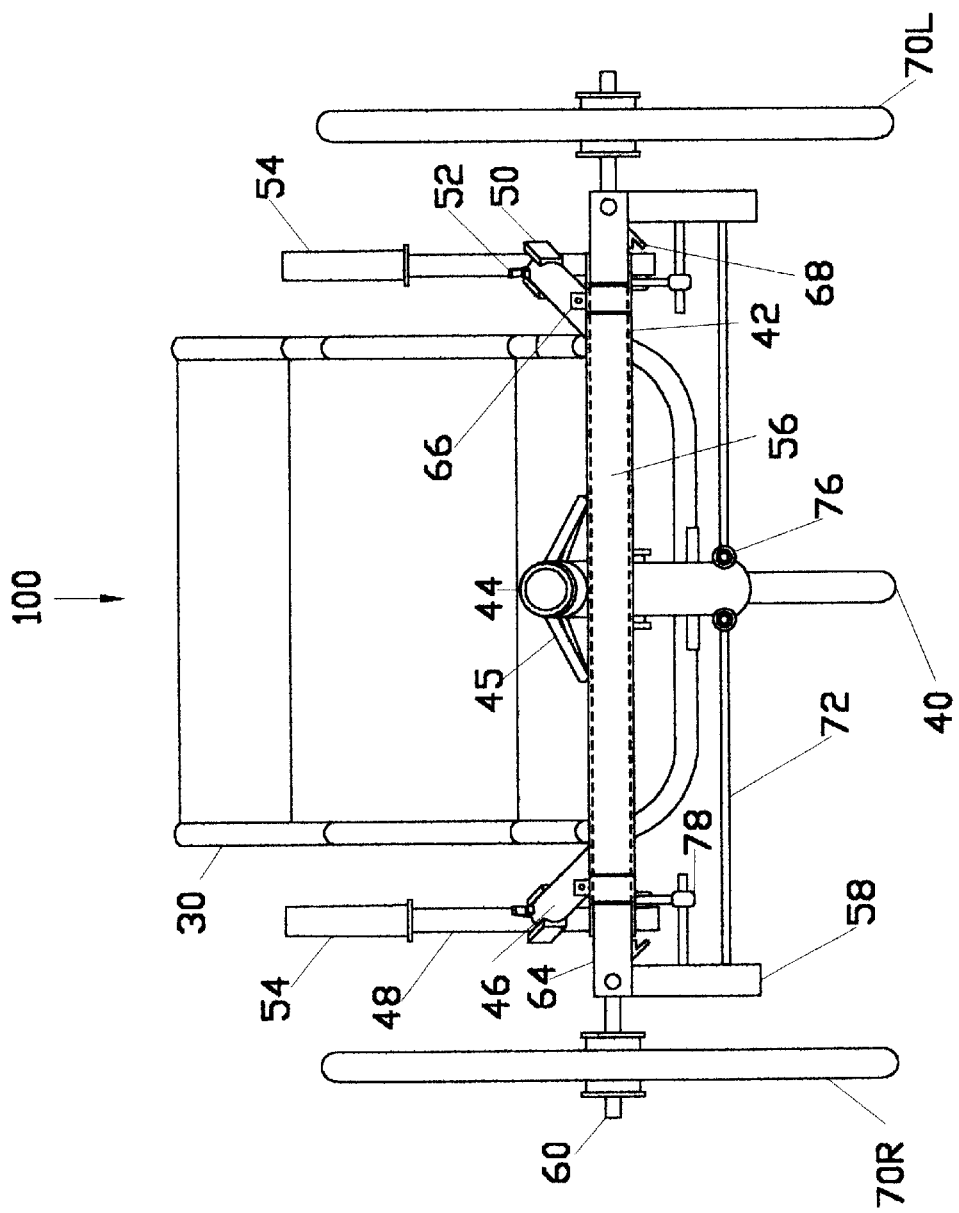
FIG. 2 is a front elevational view of vehicle 100 vertical with wheels straight and crank assembly and boom removed to show detail of leaning components.
Figure 3:
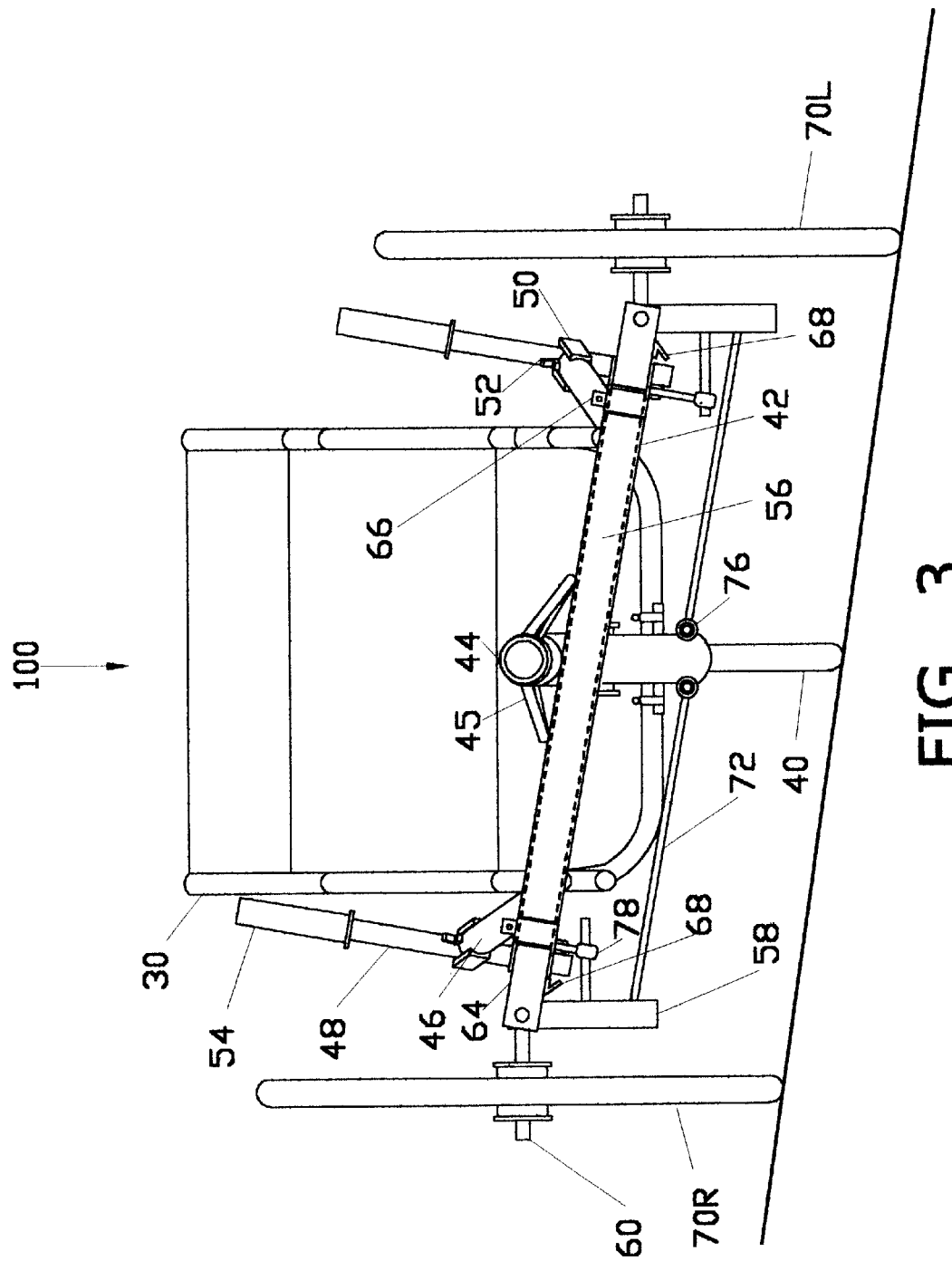
FIG. 3 is a front elevational view of vehicle 100 on inclined surface leaning with wheels straight and crank assembly and boom removed to show detail of leaning components.

| 100 | Vehicle | 48 | Steering Levers |
| --- | --- | --- | --- |
| 20 | Main Frame | 50 | Steering Arm Clevis and Pin |
| 21 | Pedals | 52 | Steering Stops |
| 22 | Crank Assembly | 54 | Hand Grips |
| 24 | Adjustable Length Boom, with Clamp | 56 | Axle |
| 26 | Inner Boom | 58 | Control Arms |
| 28 | Inner Boom Clamp | 60 | Wheel Spindles |
| 30 | Recumbent Seat | 62 | Leaning Tie Rod Connections |
| 34 | Lateral Operator Supports | 64 | Axle Clevis and Pin |
| 36 | Upper Seat Bracket | 66 | Axle Clamps |
|  |  | 68 | Lean Stops |

-continued

| 38 | Lower Seat Bracket | 70R | Right Wheel |
| --- | --- | --- | --- |
| 40 | Rear Wheel | 70L | Left Wheel |
| 42 | Axle Housing | 72 | Leaning Tie Rods |
| 44 | Pivotal Collar | 74 | Steering Tie Rods |
| 45 | Brace | 76 | Swivel Tie Rod Ends |
| 46 | Steering Arms | 78 | Steering Tie Rod Connections |

DESCRIPTION OF PREFERRED EMBODIMENT

FIGS. 1 through 8 illustrate the preferred embodiment of the invention. Vehicle 100 consists of a main frame 20 that carries the pedals 21 and crank assembly 22, adjustable length boom with clamp 24, inner boom 26 with inner boom clamp 28, recumbent seat 30 with lateral operator supports 34, upper and lower seat brackets 36 & 38, respectively, and rear wheel 40. A perpendicular housing 42 with pivotal collar 44 mounted with brace 45 on center with two laterally spaced steering arms 46 extending rearward. Steering levers 48 are pivotally mounted at end of steering arms 46 on steering arm clevis and pin 50. Steering stops 52 are also mounted near end of steering arms 46. Hand grips 54 are mounted on steering levers 48. An axle 56 rotates within axle housing 42 and a pair of control arms 58 fixed with perpendicular wheel spindles 60 and leaning tie rod connections 62 are pivotally connected at opposite ends of the axle 56 by axle clevis and pin 64, mounted axle clamp 66. Also, lean stops 68 are mounted on axle clamp 66. Right and left wheels 70R and 70L, respectively are mounted on each wheel spindle 60. A pair of leaning tie rods 72 with swivel tie rod ends 76 connect ends of control arms 58 at leaning tie rod connections 62 to lower portion of main frame 20 at leaning tie rod connections 62. A pair of steering tie rods 76 connect ends of steering levers 48 to control arms 58 midway between axle clevis and pin 64 and leaning tie rod connection 62 at steering tie rod connections 78.

Description and discussion of propulsion and braking components have been omitted as these are of a type ordinarily used in vehicles where the rear wheel is driven. It is also assumed that all moving, rotating, or pivoting connections or abutments are fitted with proper bearings, bushings, or other suitable friction reducing devices and discussion of such aspects will be omitted.

OPERATION OF PREFERRED EMBODIMENT

Figure 4:
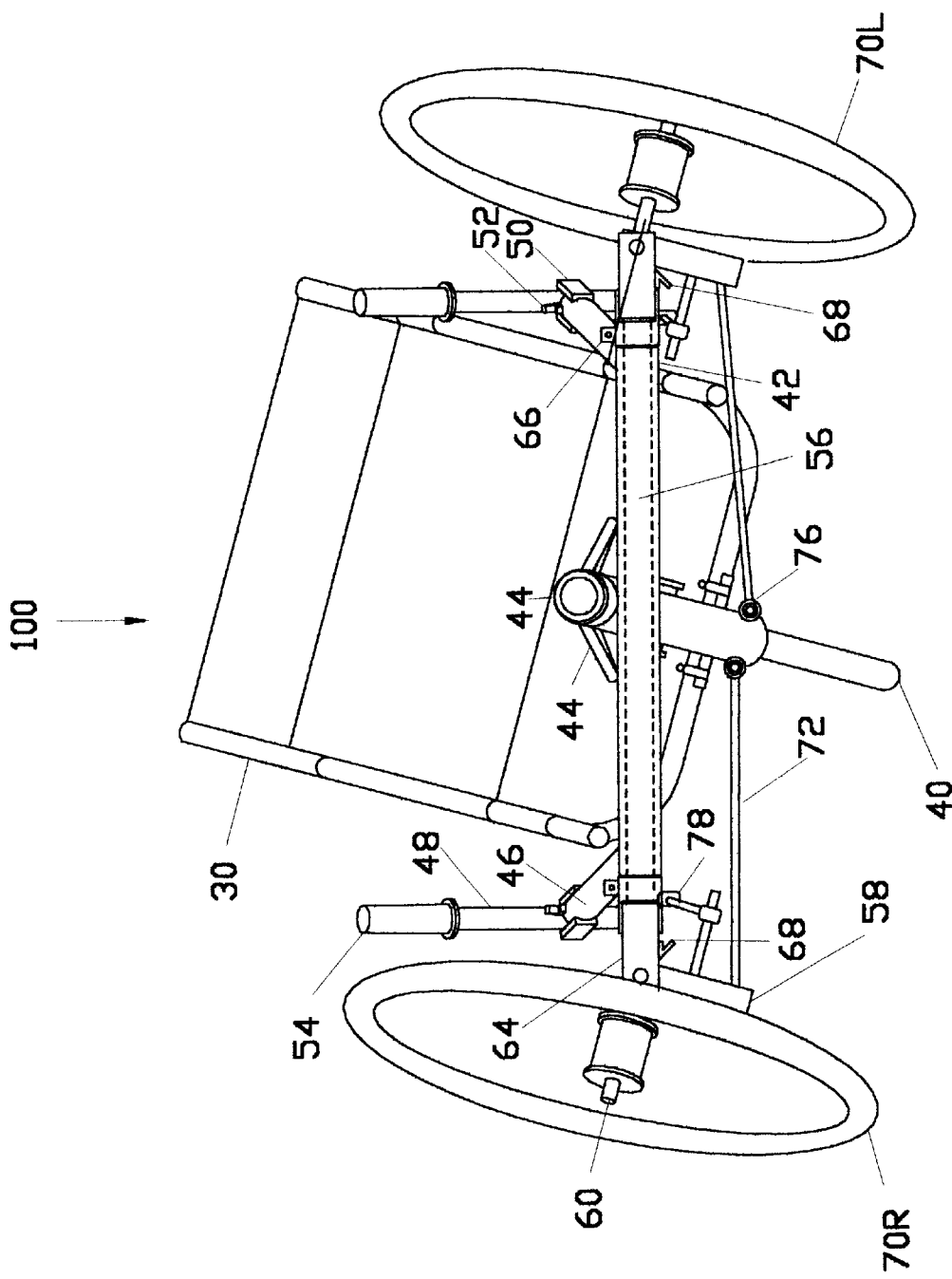
FIG. 4 is a front elevational view of vehicle 100 leaning and turning front wheels with crank assembly and boom removed to show detail of leaning components.
Figure 5:
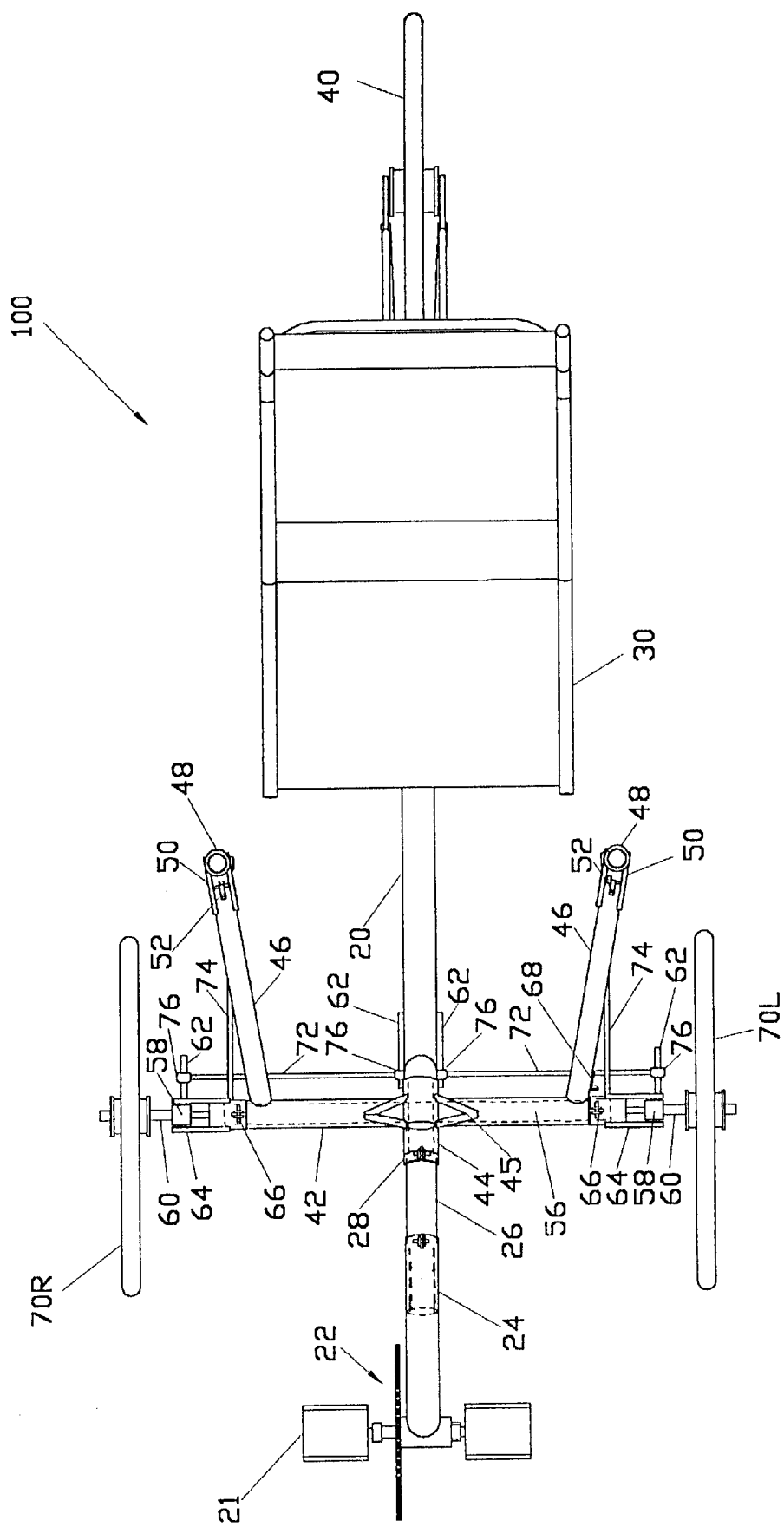
FIG. 5 is a plan view of vehicle 100 vertical with wheels straight.
Figure 6:
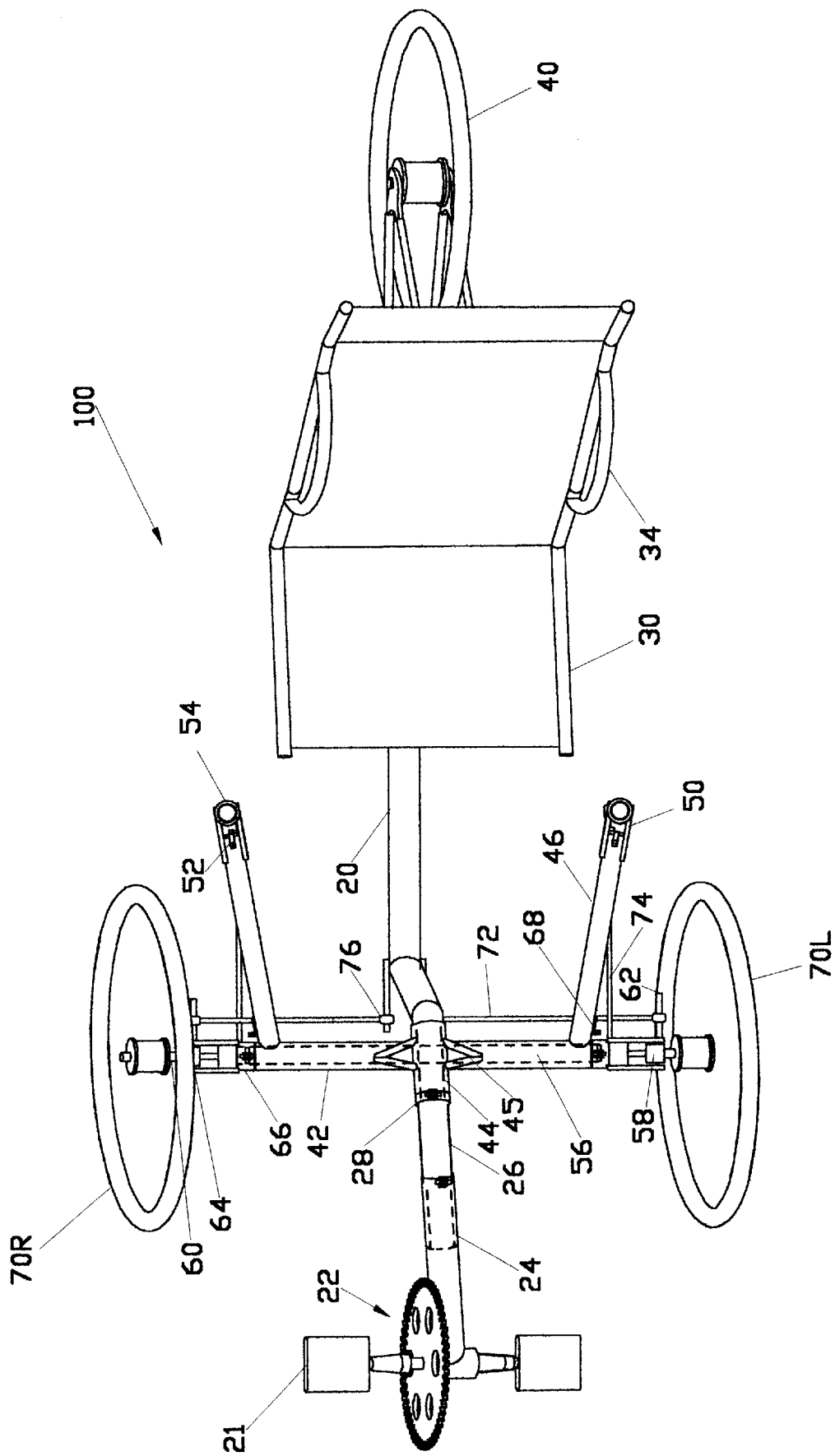
FIG. 6 is a plan view of vehicle 100 leaning with wheels straight.
Figure 7:
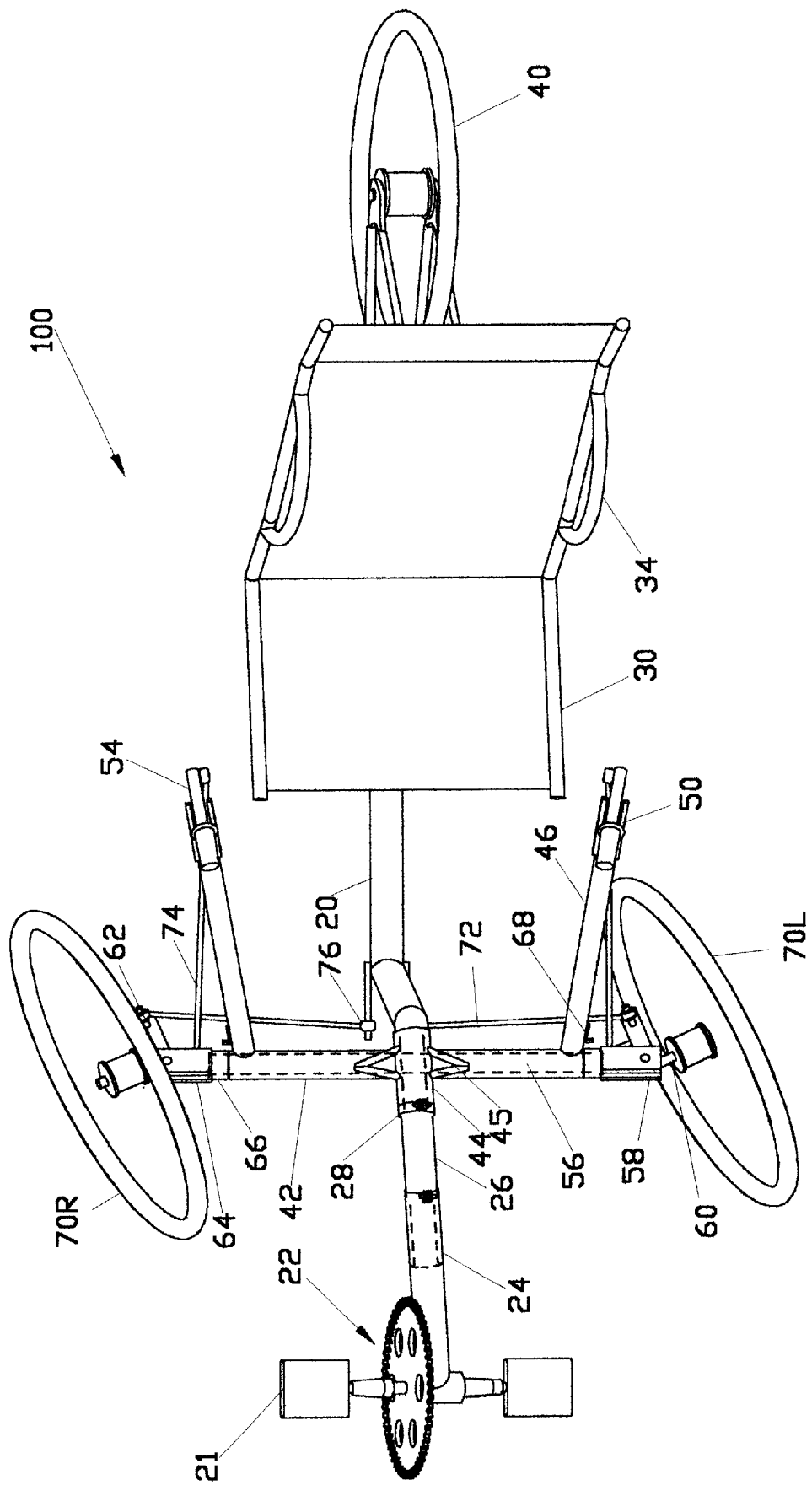
FIG. 7 is a plan view of vehicle 100 leaning and turning front wheels.
Figure 8:
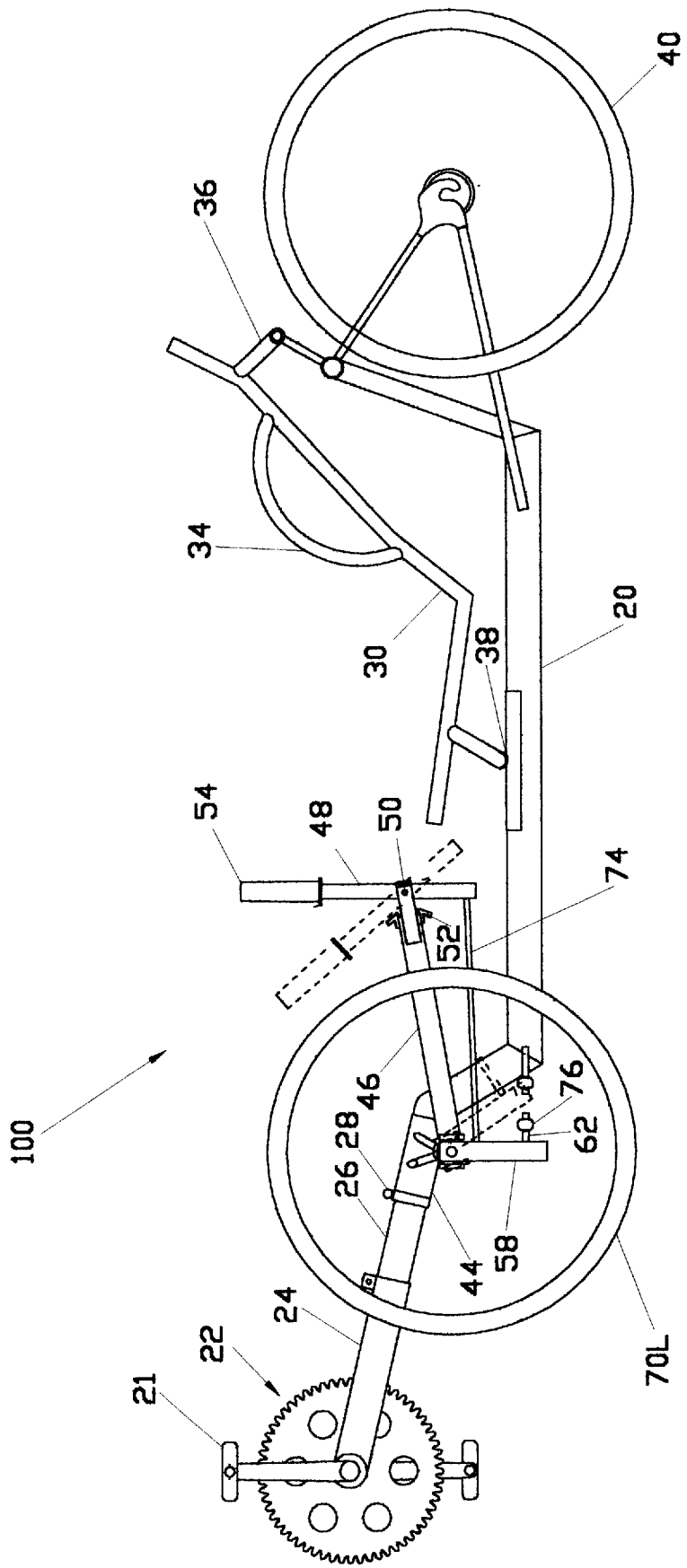
FIG. 8 is a side elevational view of vehicle 100 showing movement of control arms and steering levers with wheel hub removed to show detail.

FIGS. 1 through 8 show operation of vehicle 100. Recumbent seat 30 is adjustable forward and back and reclinable to operator's preference with lateral operator supports 34 cradling upper body; feet are placed on pedals 21 of crank assembly 22 which is adjustable forward and back for operator's leg length. Hands are placed on handgrips 54 of steering levers 48. Leaning upper body of operator by pushing or pulling against hand grips 54 with arm strength, the main frame 20 and seat 30 act as a lever, rotating within the pivotal collar 44 perpendicularly mounted with braces 45 on axle housing 42, thus leaning main frame 20, crank assembly 22, seat 30 and rear wheel 40. The right and left wheels 70R and 70L, respectively also lean in relation to main frame 20, by means of leaning tie rods 72 attached to lower portion of main frame 20 and end of control arms 58 at leaning tie rod connections 62. Control arms 58 have wheel spindles 60 perpendicularly fixed to them that right and left wheels 70R and 70L, respectively are mounted on. Control arms 58 are pivotally hinged on axle clevis and pin 64, thus providing for said leaning of right and left wheels 70R and 70L, respectively. Lean stops 68 provided on axle clamp 66 limit leaning of vehicle at a predetermined degree—approximately 45 degrees from vertical—so excessive lean, from which it would be difficult to return to vertical, cannot be induced. Axle housing 42 and steering arms 46 are held in a fixed position by main frame 20 that is angled through pivotal collar 44 so as to keep axle housing 42 perpendicular to longitudinal axis of main frame 20 and steering arms 46 stationary when main frame 20 is leaned right or left. The exact angle varies depending on length of wheel base, wheel size and geometry of other angles used in constructing main frame 20. Inner boom clamp 28 is positioned close against pivotal collar 44 so no sliding in and out of mainframe 20 is incurred. Steering levers 48 at ends of steering arms 46 pivot on steering arm clevis and pin 50 by moving steering lever 48 with hands from vertical forward in an arc about steering arm levis and pin 50 in relation control arms 58 move from vertical rearward in an arc about axle 56 by means of steering tie rods 74 with swivel tie rod ends 76 connecting ends of steering levers 48 and mid-way along control arms 58 at steering tie rod connections 78. Steering stops 52 provided near end of steering arms 46 limit movement of steering levers 48 from approximately 0 degrees vertical to approximately 45 degrees forward and in relation, limit control arms 58 from approximately 0 degrees vertical to approximately 45 degrees rearward. Not only is this the comfortable range for the operator's wrists while holding hand grips 54 it is the optimal range for inducing lean and steer characteristics. If control arms 58 move forward of 0 degrees vertical, wheels 70R and 70L will steer in opposite direction of lean. If control arms 58 move rearward more than 45 degrees, lean capabilities are reduced. The axle clevis and pins 64 are held on rotating axle 56 by axle clamps 66 so both rotate together as a unit, keeping control arms 58 aligned at all times and allowing steering with only one hand on hand grip 54. The axle clamps 66 also are positioned close against axle housing 42, so no side play in axle 56 is incurred. FIGS. 2, 3, 5, & 6 show steering levers 48 in 0 degree vertical position, main frame 20 can be leaned right or left and vehicle 100 will continue rolling straight, allowing operator to keep body vertical on uneven pavement. FIGS. 4 & 7 show steering levers 48 in 45 degree forward position, maximum steering effect is achieved and sharp turns can be made when the main frame 20 is leaned all the way over to the lean stops 68. Steering is continuously adjustable throughout turn. If more turn effect is needed, operator can either move steering levers 48 forward more or lean more or both. If less turning effect is needed, operator can either bring steering levers 48 back more vertical or lean less or both.

Figure 9:
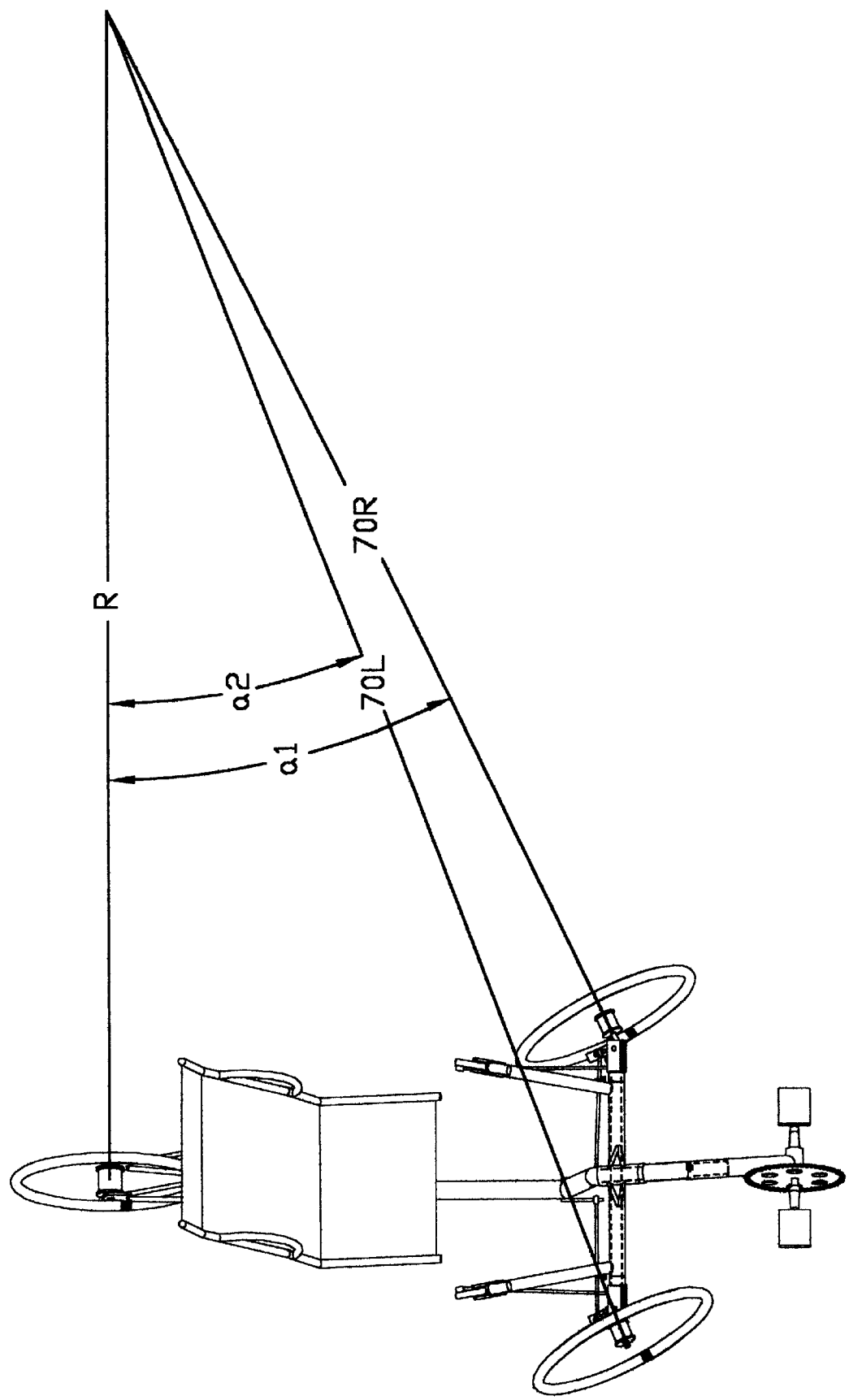
FIG. 9 is a plan view of vehicle 100 showing steering geometry in a turn and tire contact patch location.

As shown in FIGS. 7 & 9, the steering mechanism produces an effect on wheels 70R & 70L during turns that is similar to Ackerman Steering Compensation. As vehicle 100 is leaned and steered, the leaning tie rods 72 cause the control arms 58 to follow an arc about the leaning tie rod connections 62 on the main frame 20, combined with the arc the control arm 58 also makes around the axle, in effect, turning each of the front wheels 70R & 70L to different angles a1 and a2 from the line of action of rear wheel 40 at turning radius R to reduce scrubbing of tires and rolling friction through turns. FIG. 9 also shows tire contact patch location moved farther out from center of turn, giving better resistance to cornering forces.

ALTERNATIVE EMBODIMENTS

Preferred embodiment is primarily designed as human-powered, but is easily adaptable to have an auxiliary motor power the rear wheel and fitted with throttle and clutch as on a motorcycle or, by eliminating the pedals and crank, be solely motor-driven and fitted with accelerator, clutch and brake pedals, as on a car.

Could also be adapted to have four wheels, two in front and two in rear, with the rear wheels connected similarly to front axle but without rotating capability so they only lean into a turn but have no steering effect Alternately, rear wheels could be mounted on a parallelogram structure as in prior art, to allow them to lean into a turn but this would only serve to complicate the vehicle and make it heavier, without adding any appreciable benefits, other than load carrying capacity. Simple cargo trailer designs already available in the marketplace would be easily attachable to the tricycle of invention; one such item, named B.O.B. (Beast of Burden), has a leaning feature that makes it particularly compatible. While the above descriptions contain many specifics, these should not be construed as limitations on the scope of the invention, but rather as exemplification of one preferred embodiment thereof. Many other variations are possible, such as:

Pivotal collar 44 could be mounted under axle housing 42 instead of on top.

Main frame 20 could swing from pivots on axle housing 42 in place of pivotal collar 44.

Steering stops 52 could be mounted on either side of axle housing 42 to stop rotation of axle 56 and control arms 58.

Lean stops 68 could be mounted on either side of pivotal collar 44 or axle housing 42.

Steering tie rod connections 78 could be mounted on arm extending from axle clamps 66 instead of control arms 58 or directly to leaning tie rods 72.

Seat 30, adjustable to operator preference as shown, could instead be fixed in one location.

Sling seat 30 (shown) could be replaced with a solid bucket seat made of many various materials.

Crank boom 24 with crank assembly 22, adjustable as shown, could instead be fixed in one location.

Width of lateral side supports 34 could be made adjustable or alternately, padded to custom-fit operator.

In motor-driven embodiment, seatbelts would be required, eliminating the need for lateral operator supports 34.

The present disclosed embodiments are to be considered illustrative of the invention which is intended to cover all changes and modifications of the example herein which do not constitute departures from the spirit or scope as defined in the following claims.

What is claimed is:

1. A multi-wheeled vehicle with controlled wheel and body lean comprising:

A longitudinal main frame having a seat, and at least one rear wheel;

A perpendicular frame having laterally spaced arms extending rearward generally parallel to said main frame;

Means for pivotally connecting said main frame to said perpendicular frame for providing pivotal motion of said main frame through an approximately 90 degree arc about a generally longitudinal axis;

A pair of levers, each lever pivotally connected to ends of said arms;

An axle rotatably mounted in said perpendicular frame;

A pair of wheel spindles, each spindle located on opposite ends of said axle;

Means for connecting each of said spindles to said axle, providing at least pivotal motion of said spindles relative to said axle;

A pair of wheels, each wheel being rotatably mounted on one of said spindles;

A pair of leaning tie rods having an axis generally parallel to the axis of said axle for controlling the pivotal motion of said spindles relative to said main frame;

Means for pivotally and rotatably connecting outer ends of said leaning tie rods to said spindles, providing for movement through an approximately 45 degree arc about said axle, and lateral movement of said tie rods;

Means for pivotally and rotatably connecting inner ends of said leaning tie rods to said main frame, providing for movement through an approximately 45 degree arc about said main frame connection, and lateral movement of said leaning tie rods;

A pair of steering tie rods having an axis generally parallel to said arms for controlling the rotational motion of said axle relative to said levers;

Means for pivotally connecting said steering tie rods to said axle, providing for movement through an approximately 45 degree arc about said axle, and longitudinal movement of said tie rods;

Means for pivotally connecting said tie rods ends to said levers, providing movement through an approximately 45 degree arc about said levers pivotal connection, and longitudinal movement of said tie rods.

2. The multi-wheeled vehicle of claim 1, wherein said pivotal connection of said main frame to said perpendicular frame is a collar mounted on center of said perpendicular frame, said collar having a generally longitudinal axis; and said main frame pivots in said collar.

3. The multi-wheeled vehicle of claim 1, wherein said pivotal connection of said main frame to said perpendicular frame is a pair of spindles mounted on center of said perpendicular frame, said spindles having a generally longitudinal axis, and a pair of pivotal connectors mounted on said main frame.

4. The multi-wheeled vehicle of claim 1, wherein said pivotal connection of said wheel spindles to said axle is a clevis and pin on opposite ends of said axle.

5. The multi-wheeled vehicle of claim 1, wherein said pivotal connection of said steering tie rods to said axle is an arm mounted on each said clevis.

6. The multi-wheeled vehicle of claim 1, wherein said pivotal and rotatable connections of said leaning tie rods are swivel tie rod ends.

7. The multi-wheeled vehicle of claim 1, wherein said pivotal connections of said steering tie rods are swivel tie rod ends.

* * * * *